US006717099B2

United States Patent
Arya

(12) United States Patent
(10) Patent No.: US 6,717,099 B2
(45) Date of Patent: Apr. 6, 2004

(54) PART INTERFACE DESIGN FOR WELDING MATERIALS THAT ARE DIFFICULT TO WELD

(75) Inventor: Satya P. Arya, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/166,100

(22) Filed: Jun. 10, 2002

(65) Prior Publication Data

US 2003/0226828 A1 Dec. 11, 2003

(51) Int. Cl.⁷ .............................................. B23K 26/00
(52) U.S. Cl. ............................ 219/121.64; 219/121.63; 219/121.85
(58) Field of Search ................. 219/121.64, 121.63, 219/121.85, 121.65, 121.66

(56) References Cited

U.S. PATENT DOCUMENTS

| 4,386,728 A | * | 6/1983 | Torok et al. ............... 228/111 |
| 4,916,284 A | * | 4/1990 | Petrick ................... 219/121.64 |
| 5,811,756 A | * | 9/1998 | Horita et al. ........ 219/137 WM |
| 5,861,602 A | | 1/1999 | Cox et al. |
| 6,108,209 A | | 8/2000 | Cox et al. |
| 6,194,683 B1 | | 2/2001 | Cox et al. |

FOREIGN PATENT DOCUMENTS

| JP | 63177992 A | 7/1988 |
| JP | 7164173 A | 6/1995 |
| JP | 11077347 A | 3/1999 |
| JP | 11138280 A | 5/1999 |

* cited by examiner

Primary Examiner—M. Alexandra Elve
(74) Attorney, Agent, or Firm—Robert B. Martin; Bracewell & Patterson, L.L.P.

(57) ABSTRACT

A joining technique and design for welding hard to weld elements of a disk drive suspension machines or coins the parts to be welded at their weld interface. A small pocket is formed at the weld interface to let evaporated material gases escape during welding and reduce gas bubble trapping in the weld nugget. For laser welding, a pocket is formed in thick parts to control the welded web thickness for fast melting and thorough mixing of top and bottom materials. For resistance spot welding, it may be necessary to form pockets in both materials on the electrode contact side to reduce material thickness. This technique provides a weld interface design that solves joint reliability and dynamic variation problems. This technique can be used to attach aluminum-to-aluminum or other materials that are difficult to weld due to porous welds, and to improve weld quality of both spot and seam welds.

17 Claims, 3 Drawing Sheets

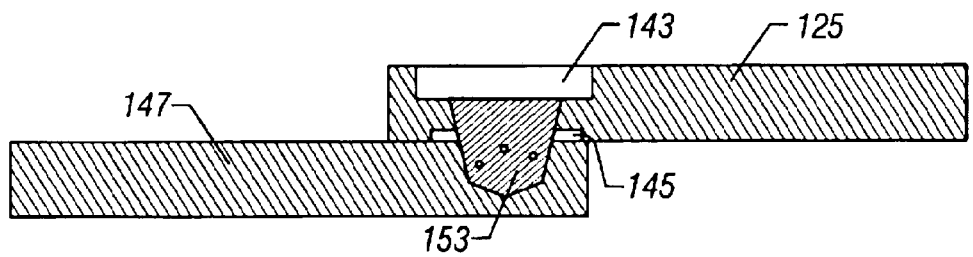
FIG. 5F
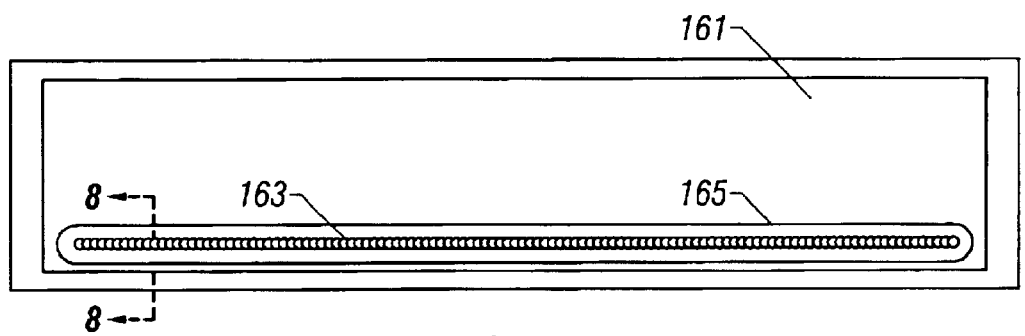
FIG. 6
FIG. 7
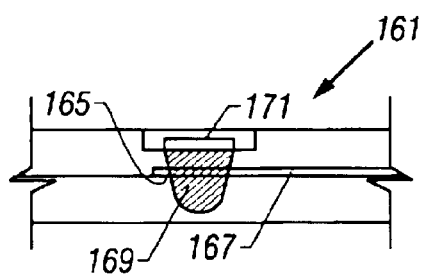
FIG. 8
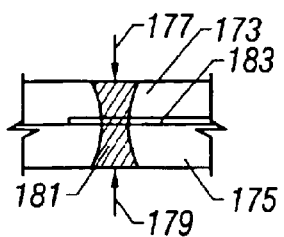
FIG. 9

PART INTERFACE DESIGN FOR WELDING MATERIALS THAT ARE DIFFICULT TO WELD

BACKGROUND OF THE INVENTION

1. Technical Field

The present invention relates in general to an improved welding technique, and in particular to an improved part interface design and method for laser spot welding materials that are difficult to weld together.

2. Description of the Prior Art

Generally, a data access and storage system consists of one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, one to six disks are stacked vertically on a common spindle that is turned by a disk drive motor at several thousand revolutions per minute (rpm).

A typical HDD also utilizes an actuator assembly. The actuator moves magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

Typically, a slider is formed with an aerodynamic pattern of protrusions on its air bearing surface (ABS) that enables the slider to fly at a constant height close to the disk during operation of the disk drive. A slider is associated with each side of each platter and flies just over the platter's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The head and arm assembly (HSA) is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop and settle directly over the desired track.

Conventional disk drive components are formed primarily from aluminum and stainless steel materials. Stainless steel components such as suspension flexures, load beams, and mount plates are welded together. In contrast, aluminum components such as combs, covers, and base castings are bolted together due to the difficulty of welding aluminum to aluminum. Bolted joints are expensive, create contamination, and can creep under vibration and temperature variations, and have dynamic variations. Drive components are made of aluminum due to its low cost, good machining and formability, excellent heat transfer, and high stiffness-to-weight ratio. Also, stainless steel to stainless steel welds of suspension components result in localized distorsions that change the flatness of suspension components resulting in higher gain of some dynamic modes. In addition, future disk drives may need to be filled with gases like helium or may need internal pressures that are lower than atmospheric pressure. This will require sealing of the drive from the atmosphere that will need aluminum-to-aluminum seam welding of the drive cover to the base.

As stated above, some disk drive components are normally made of 6061 T6 aluminum or equivalent aluminum alloys. These alloys contain manganese, magnesium, etc., low melting point alloys. Components formed from these low melting point alloys evaporate as the aluminum melts during the welding process. Welding-generated gases are trapped in the welds and contribute to porosity and interfere with homogenous mixing of the molten bodies that form the weld nugget. Typically, porosity due to trapped weld gases is at a maximum and more harmful at the center of the weld interface. For high weld strength, the interface should be free of gas bubbles/porosity. Thus, an improved joining technique and design for disk drive components that overcomes the limitations of the prior art is needed.

SUMMARY OF THE INVENTION

One embodiment of a joining technique and design for welding of hard to weld elements of a disk drive suspension is disclosed. One or both parts to be welded are machined, coined, or etched at the weld interface. A small pocket, approximately 10 to 200 μm in depth, is formed in one or both of the parts at weld interface to communicate with the atmosphere to let evaporated material gases escape all around the weld during welding so as to greatly reduce gas bubble trapping in the weld nugget. The pocket also helps in reworkability of the joint by accommodating the sheared weld nugget protruding a small amount above the material surface at interface. The presence of bubbles or a porous consistency reduces the weld strength. For laser welding, if the top part is thick, a depression or pocket is formed therein to control the welded web thickness for fast melting and thorough mixing of top and bottom materials in order to form a strong reliable weld. For resistance spot welding, if both top and bottom materials are thick, it may be necessary to form these pockets in both materials on the electrode contact side to reduce material thickness. The technique utilized in the present invention provides a weld interface design that solves the joint reliability and dynamic variation problems. This technique can be used to attach aluminum-to-aluminum or other materials that are difficult to weld due to porous welds, and to improve weld quality of both spot and seam welds. Typical disk drive applications include elimination of fasteners to join aluminum parts together.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and therefore are not to be considered limiting of its scope as the invention may admit to other equally effective embodiments.

FIGS. 5a, 5b, 5c, 5d, 5e, and 5f are enlarged side views of one of the arms and the comb of FIG. 4 showing weld pockets and interface: before welding (FIG. 5a), after welding (FIG. 5b), after shearing and placing new arm for rework (FIG. 5c), after re-welding (FIG. 5d), demonstrating weld porosity without a gas release pocket (FIG. 5e), and demonstrating the reduction in weld porosity with a gas release pocket (FIG. 5f).

FIG. 6 is a side view of an alternate seam welding pocket design for a disk drive cover.

FIG. 7 is an end view of the disk drive cover of FIG. 6.

FIG. 8 is a sectional view of the disk drive cover of FIG. 6, taken along the line 8—8 of FIG. 6.

FIG. 9 shows an alternate gas release pocket for resistance welding.

DETAILED DESCRIPTION OF THE PRESENT INVENTION

Figure 1:
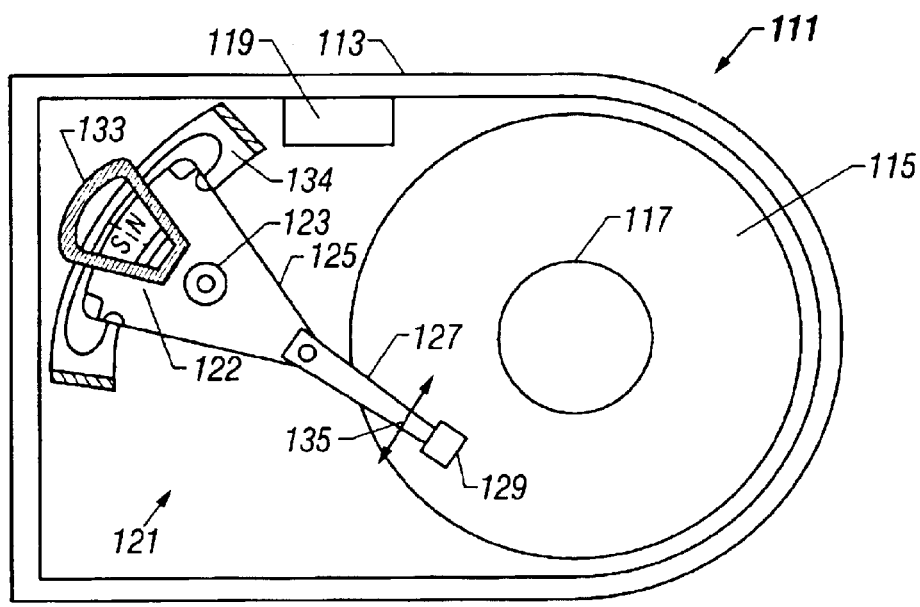
FIG. 1 is a plan view of a disk drive constructed in accordance with the present invention.

Referring to FIG. 1, a schematic drawing of one embodiment of an information storage system comprising a magnetic hard disk file or drive 111 for a computer system is shown. Drive 111 has an outer housing or base 113 containing a plurality of stacked, parallel magnetic disks 115 (one shown) which are closely spaced apart. Disks 115 are rotated by a spindle motor assembly having a central drive hub 117. An actuator 121 comprises a plurality of parallel actuator arms 125 (one shown) in the form of a comb 122 that is pivotally mounted to base 113 about a pivot assembly 123. A controller 119 is also mounted to base 113 for selectively moving the comb of arms 125 relative to disks 115.

In the embodiment shown, each arm 125 has extending from it at least one cantilevered load beams or suspensions 127, a magnetic read/write transducer or head 129 mounted on a slider secured to a flexure that is flexibly mounted to each suspension 127. The read/write heads 129 magnetically read data from and/or magnetically write data to disks 115. The level of integration called head gimbal assembly is head 129 and the slider are mounted on suspension 127. The slider is usually bonded to the end of suspension 127. Head 129 is typically pico size (approximately 1250×1000×300 microns) and formed from ceramic or intermetallic materials. Head 129 also may be nano size (approximately 2050× 1600×450 microns) and is pre-loaded against the surface of disk 115 (in the range two to ten grams) by suspension 127.

Suspensions 127 have a spring-like quality which biases or urges the slider air bearing surface against the disk to enable the creation of the air bearing film between the slider and disk surface. A voice coil 133 housed within a conventional voice coil motor magnet assembly 134 (top pole not shown) is also mounted to arms 125 opposite the head gimbal assemblies. Movement of the actuator 121 (indicated by arrow 135) by controller 119 moves head gimbal assemblies 129 radially across tracks on the disks 115 until the heads 129 settle on the target tracks. The head gimbal assemblies operate in a conventional manner and always move in unison with one another, unless drive 111 uses multiple independent actuators (not shown) wherein the arms can move independently of one another.

Figure 2:
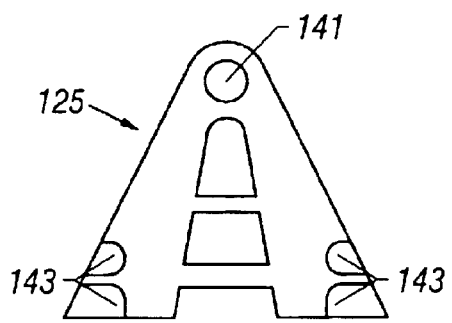
FIG. 2 is a top view of an actuator arm of the disk drive of FIG. 1.
Figure 3:
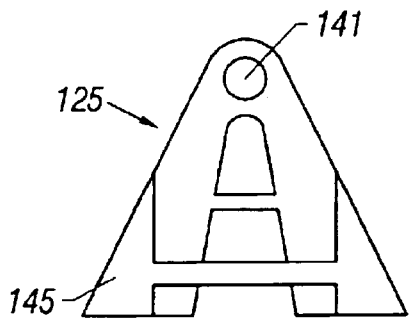
FIG. 3 is a bottom view of the actuator arm of FIG. 2.

Referring now to FIGS. 2 and 3, one embodiment of an actuator arm 125 constructed in accordance with the present invention is shown. A distal end of arm 125 has a swage hole 141 on at least one of its top and bottom surfaces for attaching a suspension 127. In some versions, a suspension 127 is attached to each surface of arm 125 at the swage holes 141. In the embodiment shown, one surface of arm 125 (FIG. 2) is provided with at least one optional weld pocket 143, preferably one on each side. Each weld pocket 143 is essentially a depression that may be coined, etched, or machined or otherwise formed in the surface of arm 125, depending on the overall thickness of arm 125. Weld pockets 143 may be formed in the interior of arm 125, or extend continuously from an interior of arm 125 to its exterior or perimeter edge, including an intermediate communication channel extending therebetween. If needed, weld pockets 143 are designed to reduce the thickness of arm 125 at its weld sites to form a better weld, and to reduce the amount of input heat energy required to complete the weld.

The opposite surface of arm 125 (FIG. 3) is also formed with at least one gas release pocket 145, which can be coined, etched, or machined as well. Gas release pocket 145 extends continuously from an interior of arm 125 to the perimeter of arm 125 for reasons that will be explained below. In the version shown, arm 125 has one gas release pocket 145 in its surface (FIG. 3) that extends continuously from one side of its perimeter to the other. Importantly, gas release pocket 145 extends continuously below each of the weld pockets 143 of arm 125 that are shown in FIG. 2. Ideally, the depth of gas release pocket 145 (relative to the surface of arm 125) is approximately 200 $\mu$m or less, but can be up to about half the thickness of the top material through which heat is applied.

Figure 4:
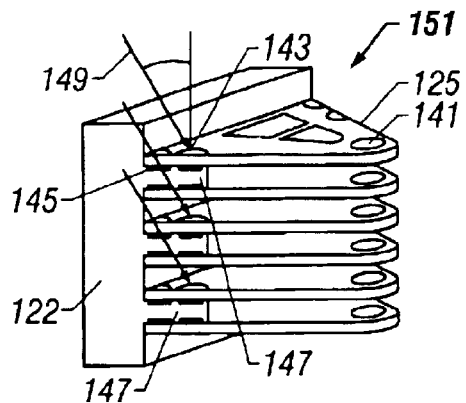
FIG. 4 is an isometric view of a plurality of the arms of FIGS. 2 and 3 attached to an actuator comb with spot welds.

In operation (FIGS. 4 and 5), arm 125 is joined to comb 122, preferably with a laser welding technique. Comb 122 has at least one platform 147 to which each arm 125 is welded. Each platform 147 is generally flat and rectangular, and protrudes a short distance from the main body of comb 122. In the simplified version shown, comb 122 has three platforms 147, each of which can support two arms 125. As shown in FIG. 4, a laser welding beam 149 is directed onto one of the weld pockets 143 on the upper surface of the uppermost arm 125. Although laser welding beam 149 could be oriented perpendicular to the surface of arm 125 (only on the uppermost arm), it is directed at angle of up to 45 degrees from normal. In FIG. 4, laser welding beam 149 is shown at an angle of approximately 30 degrees from normal. While laser welding beam 149 is welding arm 125 to platform 147, an inert gas is provided by an inert gas supply 151 (illustrated schematically), preferably from an opposite side of laser welding beam 149 to the weld site. The presence of the inert gas during welding reduces oxidation of the welded parts.

Figure 5A:
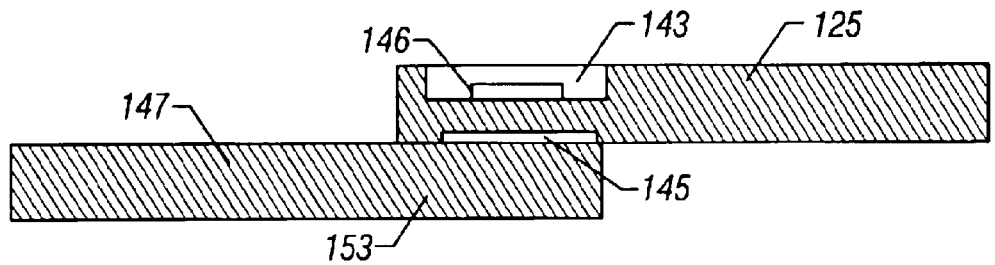

Arm 125 and platform 147 are shown prior to welding in FIG. 5a. The end result of directing laser welding beam 149 into weld pocket 143 is the formation of a weld nugget 153 (FIG. 5b) that secures arm 125 to platform 147. Since gas release pocket 145 extends to the perimeter of arm 125, it is interconnected with and freely communicates with the ambient atmosphere. As a result, the evaporated material gases and other gases produced between the welded parts during the welding process are readily released through gas release pocket 145 to the atmosphere, thereby reducing bubbles in and/or the porosity of the weld nugget 153 and materials distortion near the weld.

This design is especially beneficial for use with materials that are difficult to weld together, such as aluminum components. Although, it also helps in improving weld quality of all types of material by reducing porosity and distortion at and near the weld sites. If the two materials being welded are incompatible, an optional welding rod material formed pallet 146 may be used to help form weld nugget 153. Pallet 146 may be formed from, for example, 4047 aluminum or other materials and can be placed at the top (as shown) where laser beam strikes or in the pocket at weld interface (not shown).

In order for the remaining arms 125 (i.e., those other than the outermost arm) to be welded to their respective platform 147, the ability to offset laser welding beam 149 by a desired angle from perpendicular is even more critical. Because of the very limited distance between arms 125, the presence of weld pockets 143 (which reduce the thickness of the arm) ensure that an adequate weld nugget 153 is formed at each weld site. This element is particularly helpful for welding arms 125 having a greater thickness that would otherwise preclude the formation of an adequate weld nugget 153. After a weld has been formed in each of the weld pockets 143 of all of the upward-facing arms 125 (three shown), the comb stack or assembly (FIG. 4) is inverted so that the remaining arms 125 (three more) may be welded to their respective platforms 147 in the same manner previously described.

Figure 5B:
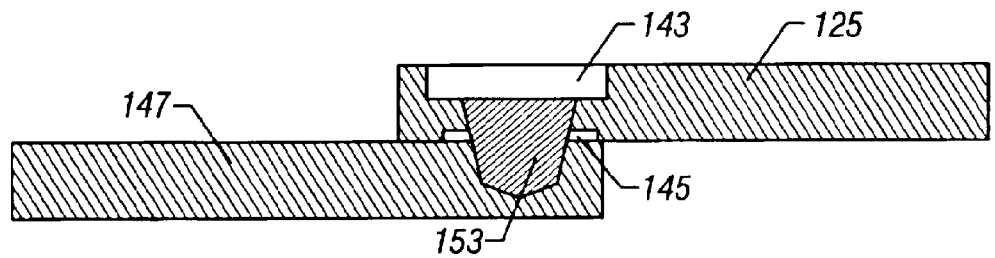
Figure 5C:
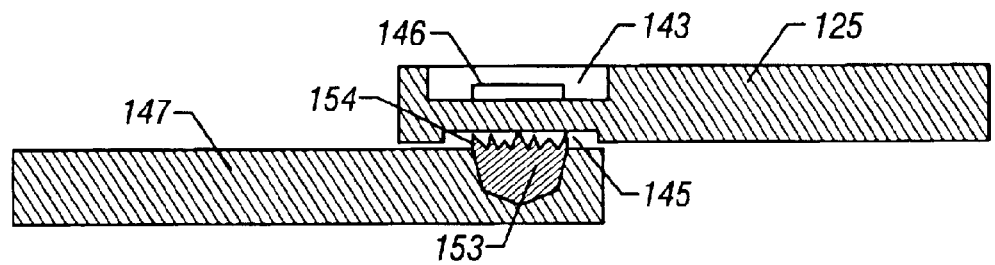
Figure 5D:
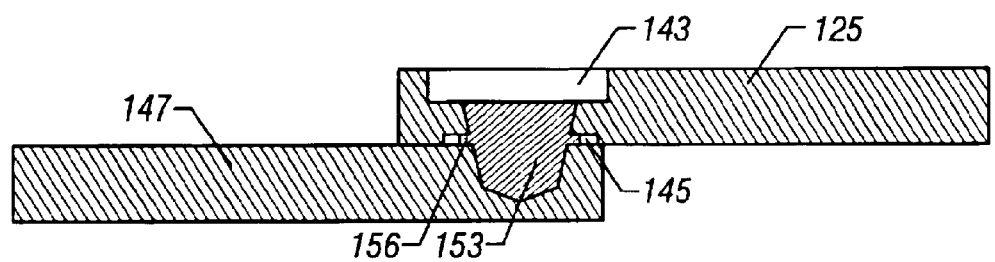
Figure 5E:
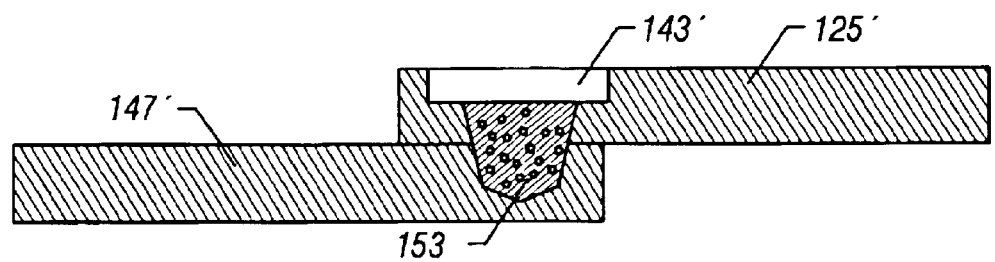

Ideally, the arms 125 are formed from 4047 or other welding rod aluminum for better welds and reworkability, but the comb 122 can be formed from almost any other aluminum. If the arms 125 are formed from a material other than 4047 aluminum, 4047 aluminum may need to be used as a filler material to ensure that the arm material mixes with the material of the other component. In addition, the completed comb assembly (FIG. 4) may be reworked by shearing off the existing arms, and positioning and welding new arms on the comb. The gas release pocket 145, accommodates the protrusions of sheared weld nugget 154 above the surface of the comb 122 (FIG. 5c), and permits the new arm to sit close to the comb surface. As the laser beam strikes the top of arm material, part of it melts and falls on the top of the sheared weld nugget. The protruding sheared weld nugget melts due to heat from the fallen material, and the arm moves down to register flat against the comb platform (FIG. 5b). Excess material from the sheared weld nugget becomes part of the newly formed weld nugget and grows into the gas release pocket (e.g., sideways) as extensions 156 at the weld interface (FIG. 5d). In this process the arms are welded to the comb surfaces with better, stronger weld nuggets.

Another embodiment of the present invention is depicted in FIGS. 6–9. In this version, a disk drive base and cover 161 are welded together with a seam weld 163. A weld gas relief pocket 165 is provided in either the base or cover 161. Pocket 165 is an elongated recess that may be formed in any desired shape. A plurality of passages 167 extend from pocket 165 to the external atmosphere to release weld gases and thereby reduce the porosity of the ultimately formed weld nugget 169 (FIG. 8), as described above for the previous embodiments. If the two materials being welded are incompatible, an optional prefabricated welding rod material shape 171 may be used to help form weld nugget 169, as described above for pallet 146.

FIG. 9 depicts yet another alternate embodiment of the present invention. In FIG. 9, two components 173, 175 are joined via an arc weld or a resistance weld. The resistance weld employs two electrodes 177, 179 (indicated schematically) to form a weld nugget 181 that extends between components 173, 175. The arc weld uses one consumable electrode (not shown) and the assembly to be welded is grounded. In all cases, the weld-related gases escape through a gas release pocket 183, as described previously for the other alternate embodiments.

The present invention has several advantages including the ability to allow materials that are difficult to weld, such as aluminum, to be joined together via laser spot welding. The designed weld web thickness of the parts allow adequate laser weld nuggets to form, and the presence of the gas release pockets, which are connected to the atmosphere between the welded parts, prevent gas bubbles from being trapped in the weld nuggets in order to reduce their porosity. Comparing FIG. 5e, which has no gas release pocket, with FIG. 5f, which has gas release pocket 145, the weld nugget 153' of FIG. 5e has greater trapped gas porosity than the weld nugget 153 of FIG. 5f. As a result, laser welds formed pursuant to this design are nearly free of porosity, strong, reliable, and reworkable. This design also solves the problem of low rigidity and creep for the bolted, stacked arm actuator by welding the arms and coil support to the pivot bearing housing, resulting in reduced mass and inertia of arms, coil supports, etc.

While the invention has been shown or described in only some of its forms, it should be apparent to those skilled in the art that it is not so limited, but is susceptible to various changes without departing from the scope of the invention.

What is claimed is:

1. A method of joining materials, comprising:
   providing a first component with a gas release pocket in a first surface that extends from an interior portion of the first component to an exterior of the first component;
   positioning a second component adjacent to the first component such that the gas release pocket is located therebetween and is in communication with an atmosphere;
   supplying an inert gas to reduce oxidation of the weld;
   welding the first component to the second component by applying local heat to a weld site on one of the components to form a weld nugget that extends through the gas release pocket and between the first and second components; and
   releasing weld-related gases to the atmosphere through the gas release pocket to reduce a porosity of the weld nugget.

2. The method of claim 1, further comprising the step of forming the gas release pocket in the first component at a depth of approximately 10 to 200 $\mu$m.

3. The method of claim 1 wherein a device for applying local heat during the welding step is selected from the group consisting of a laser beam, a resistance welder, and an arc welder.

4. The method of claim 1 wherein the welding step comprises forming a single spot weld or a weld seam.

5. The method of claim 1, further comprising the step of forming a weld pocket at said weld site in order to reduce a welded web thickness and reduce the input heat energy required to complete the weld.

6. The method of claim 1, further comprising the step of providing a formed shape of welding rod material at the weld site to form a stronger homogenous weld nugget.

7. The method of claim 1, further comprising the steps of:
shearing off the first component to form a sheared weld nugget having protrusions extending from the second component;
locating a replacement first component on the second component such that a replacement gas release pocket on the replacement first component accommodates the protrusions;
welding the replacement first component to the second component by applying local heat to a replacement weld site on one of the replacement first component and the second component to melt the sheared weld nugget and form a replacement weld nugget that extends through the replacement gas release pocket and between the first and second components, and excess material of the sheared weld nugget, now as part of the replacement weld nugget, grows into the replacement gas release pocket; and
releasing weld-related gases to the atmosphere through the replacement gas release pocket to reduce a porosity of the replacement weld nugget.

8. A method of joining materials, comprising:
providing a first component with a gas release pocket in a first surface that extends from an interior portion of the first component to an exterior of the first component;
positioning a second component adjacent to the first component such that the gas release pocket is located therebetween and is in communication with an atmosphere;
welding the first component to the second component by applying local heat to a weld site on one of the components to form a weld nugget that extends through the gas release pocket and between the first and second components;
forming a weld pocket at said weld site in order to reduce a welded web thickness and reduce the input heat energy required to complete the weld; and
releasing weld-related gases to the atmosphere through the gas release pocket to reduce a porosity of the weld nugget.

9. The method of claim 8, further comprising the step of forming the gas release pocket in the first component at a depth of approximately 10 to 200 $\mu$m.

10. The method of claim 8 wherein a device for applying local heat during the welding step is selected from the group consisting of a laser beam, a resistance welder, and an arc welder.

11. The method of claim 8 wherein the welding step comprises forming a single spot weld or a weld seam.

12. The method of claim 8, further comprising the steps of:
shearing off the first component to form a sheared weld nugget having protrusions extending from the second component;
locating a replacement first component on the second component such that a replacement gas release pocket on the replacement first component accommodates the protrusions;
welding the replacement first component to the second component by applying local heat to a replacement weld site on one of the replacement first component and the second component to melt the sheered weld nugget and form a replacement weld nugget that extends through the replacement gas release pocket and between the first and second components, and excess material of the sheared weld nugget, now as part of the replacement weld nugget, grows into the replacement gas release pocket; and
releasing weld-related gases to the atmosphere through the replacement gas release pocket to reduce a porosity of the replacement weld nugget.

13. A method of joining materials, comprising:
providing a first component with a gas release pocket in a first surface that extends from an interior portion of the first component to an exterior of the first component;
positioning a second component adjacent to the first component such that the gas release pocket is located therebetween and is in communication with an atmosphere;
welding the first component to the second component by applying local heat to a weld site on one of the components to form a weld nugget that extends through the gas release pocket and between the first and second components;
providing a formed shape of welding rod material at the weld site to form a stronger homogenous weld nugget; and
releasing weld-related gases to the atmosphere through the gas release pocket to reduce a porosity of the weld nugget.

14. The method of claim 13, further comprising the step of forming the gas release pocket in the first component at a depth of approximately 10 to 200 $\mu$m.

15. The method of claim 13 wherein a device for applying local heat during the welding step is selected from the group consisting of a laser beam, a resistance welder, and an arc welder.

16. The method of claim 13 wherein the welding step comprises forming a single spot weld or a weld seam.

17. The method of claim 13, further comprising the steps of:
shearing off the first component to form a sheared weld nugget having protrusions extending from the second component;
locating a replacement first component on the second component such that a replacement gas release pocket on the replacement first component accommodates the protrusions;
welding the replacement first component to the second component by applying local heat to a replacement weld site on one of the replacement first component and the second component to melt the sheered weld nugget and form a replacement weld nugget that extends through the replacement gas release pocket and between the first and second components, and excess material of the sheared weld nugget, now as part of the replacement weld nugget, grows into the replacement gas release pocket; and
releasing weld-related gases to the atmosphere through the replacement gas release pocket to reduce a porosity of the replacement weld nugget.

* * * * *